United States Patent [19]

MacWilliams et al.

[11] Patent Number: 5,572,703

[45] Date of Patent: Nov. 5, 1996

[54] METHOD AND APPARATUS FOR SNOOP STRETCHING USING SIGNALS THAT CONVEY SNOOP RESULTS

[75] Inventors: Peter MacWilliams, Aloha; Nitin V. Sarangdhar; Matthew Fisch, Beaverton; Amit Merchant, Portland, all of Oreg.

[73] Assignee: Intel Corporation, Santa Clara, Calif.

[21] Appl. No.: 203,802

[22] Filed: Mar. 1, 1994

[51] Int. Cl.$^6$ .................................................. G06F 13/14
[52] U.S. Cl. ......................... 395/473; 395/468; 395/555
[58] Field of Search ................................... 395/473, 470, 395/457, 471, 468, 472, 494

[56] References Cited

U.S. PATENT DOCUMENTS 5,339,399  8/1994  Lee et al. ................................. 395/473

OTHER PUBLICATIONS

Jim Handy, "The Cache Memory Book", 1993, pp. 159–161.
Motorola, "M68HC11 Reference Manual", 1991, pp. 2–19.
V. Popescu, et al., "the Metaflow Architecture," IEEE Micro, pp. 10–13 and 63–73, Jun. 1991.

Primary Examiner—Eddie P. Chan
Assistant Examiner—Kevin L. Ellis
Attorney, Agent, or Firm—Blakely, Sokoloff, Taylor & Zafman

[57] ABSTRACT

A protocol and related apparatus for snoop stretching in a computer system having at least one requesting agent for issuing bus transaction requests and at least one snooping agent for monitoring transaction requests and issuing bus signals onto an external bus. The bus transactions are timed by a bus clock signal having a plurality of cycles. To indicate snoop stretching, during a first cycle a first snooping agent asserts both a HIT# bus signal and a HITM# bus signal together to indicate that the first snooping agent must delay assertion of valid snoop results for a predetermined snoop period. During a later cycle, to indicate the end of the snoop stretch, the first snooping agent deasserts the assertion of both the HIT# and HITM# signals together and asserts its valid snoop results. The HIT# and HITM# signals alone each represent valid snoop results. If the first snooping agent must continue delaying assertion of valid snoop results, then it reasserts both the HIT# and HITM# bus signals together for the predetermined snoop period. If a second snooping agent is ready to assert its valid snoop results, it will do so while the first snooping agent causes a snoop stretch, and will reassert its valid snoop results up to and including the cycle that the first snooping agent deasserts it snoop stretch and asserts its own valid snoop results.

40 Claims, 11 Drawing Sheets

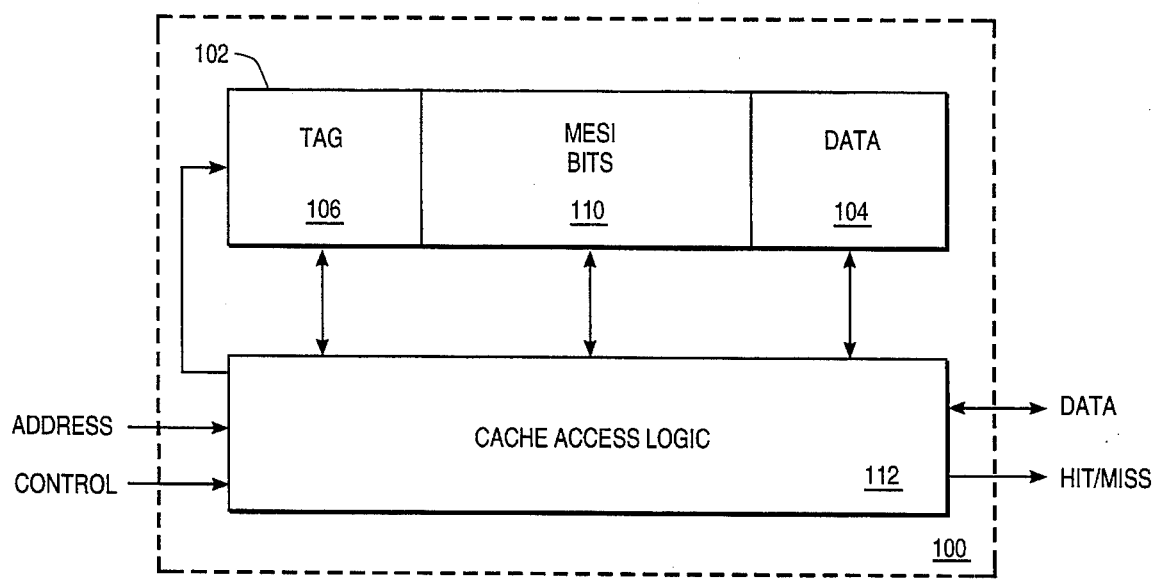
FIG_1 (PRIOR ART)
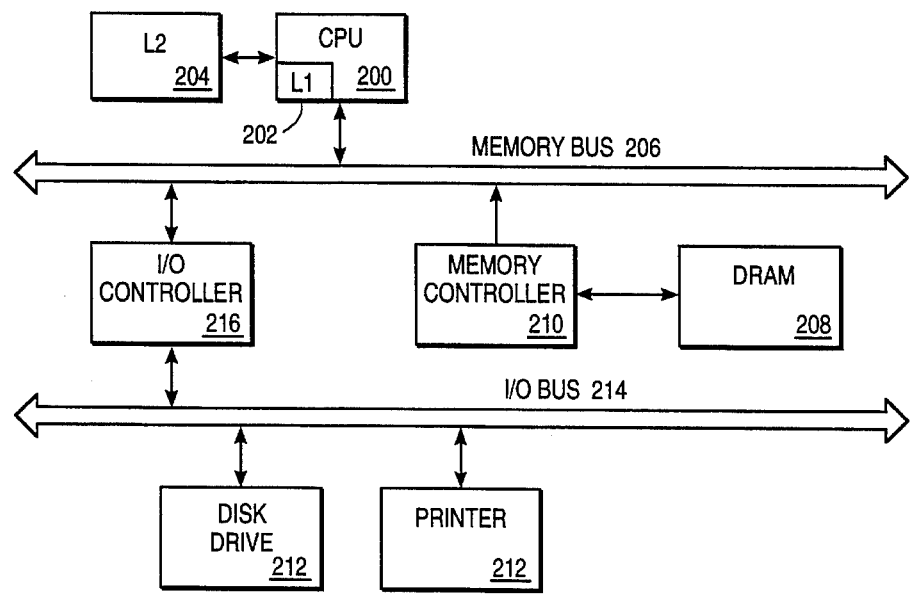
FIG_2
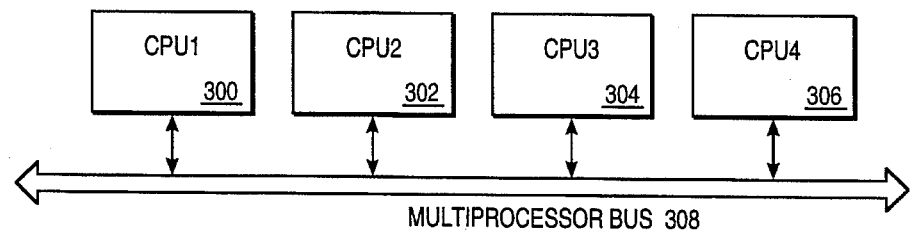
FIG_3

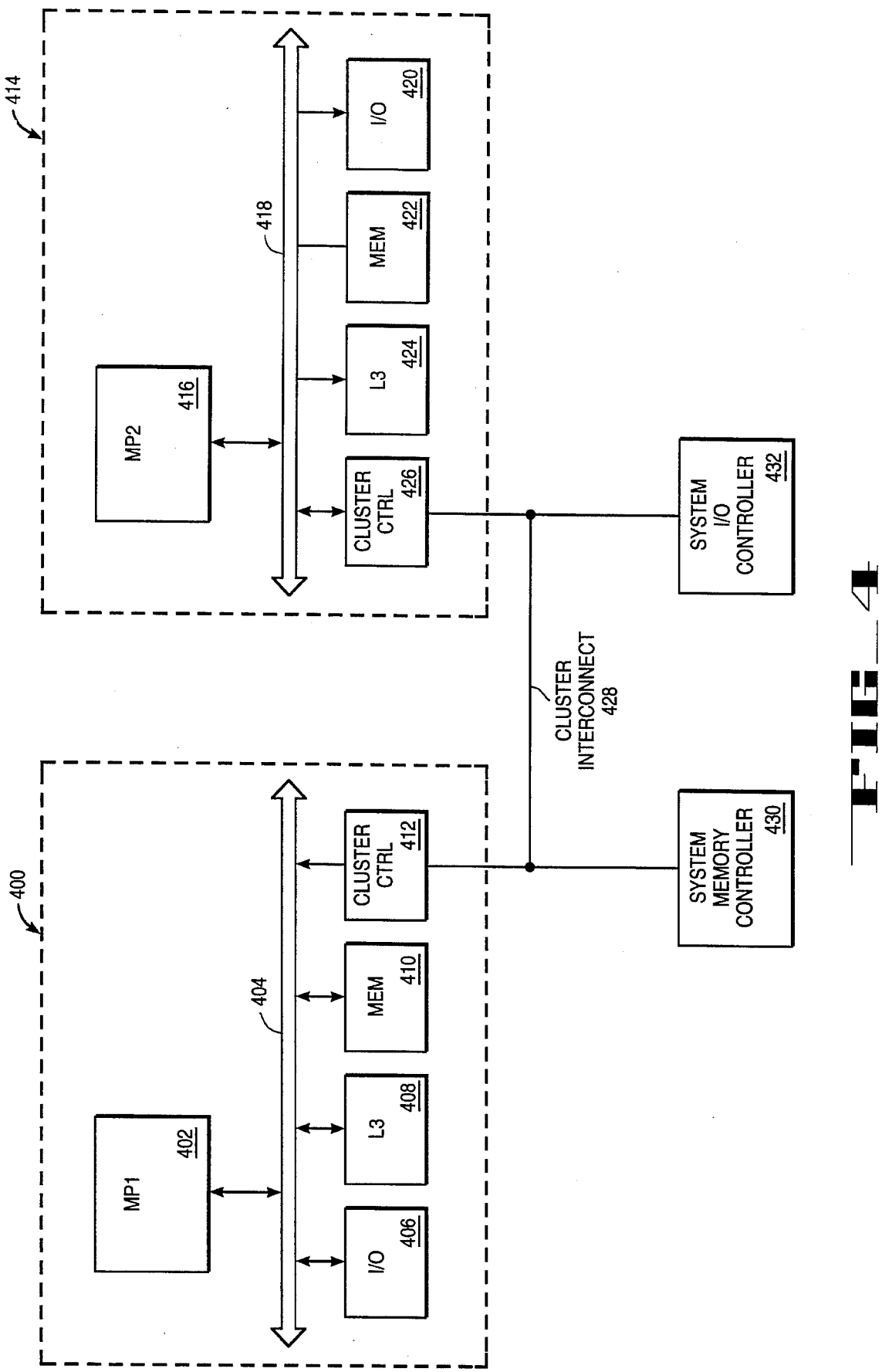
FIG._4

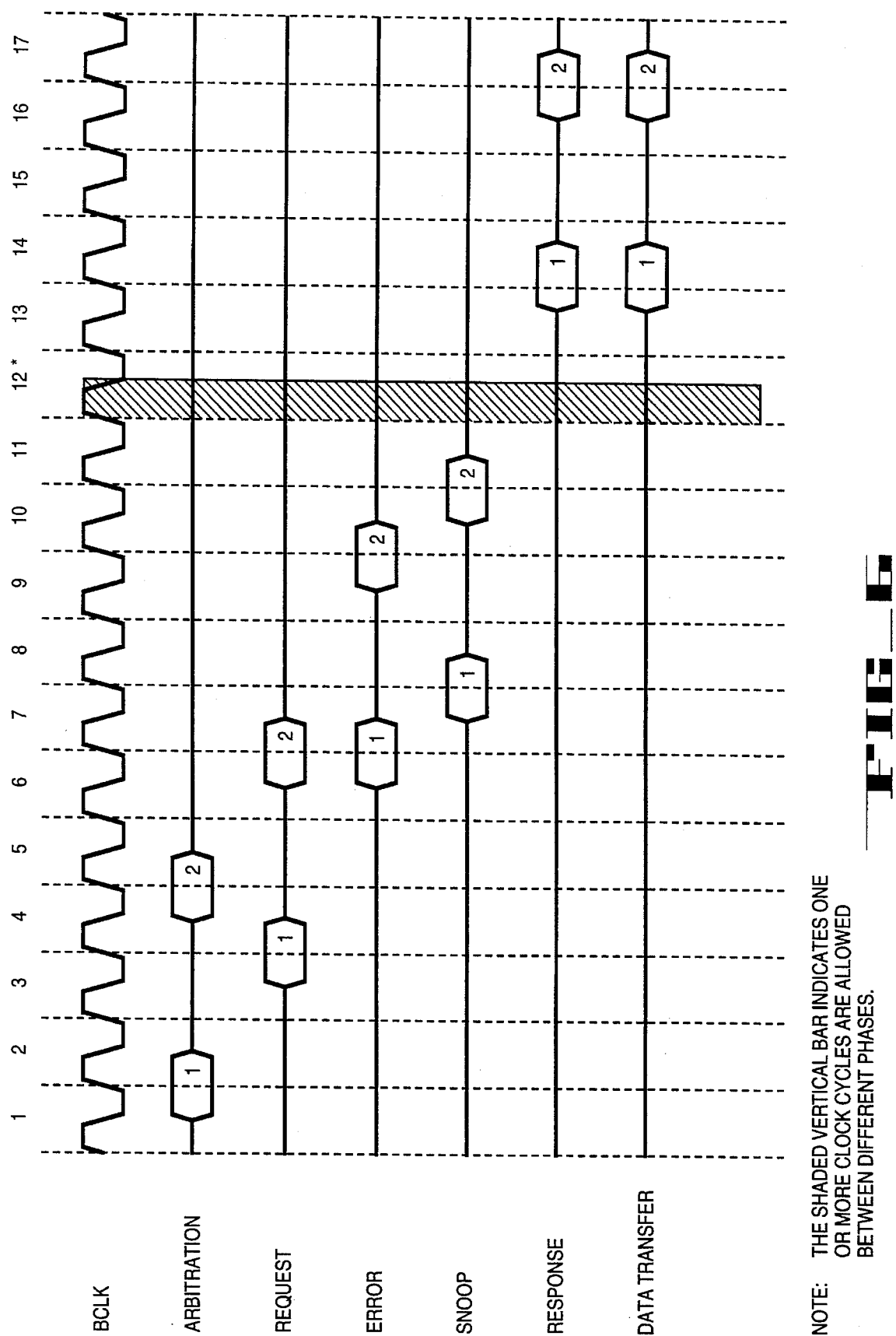
FIG_5

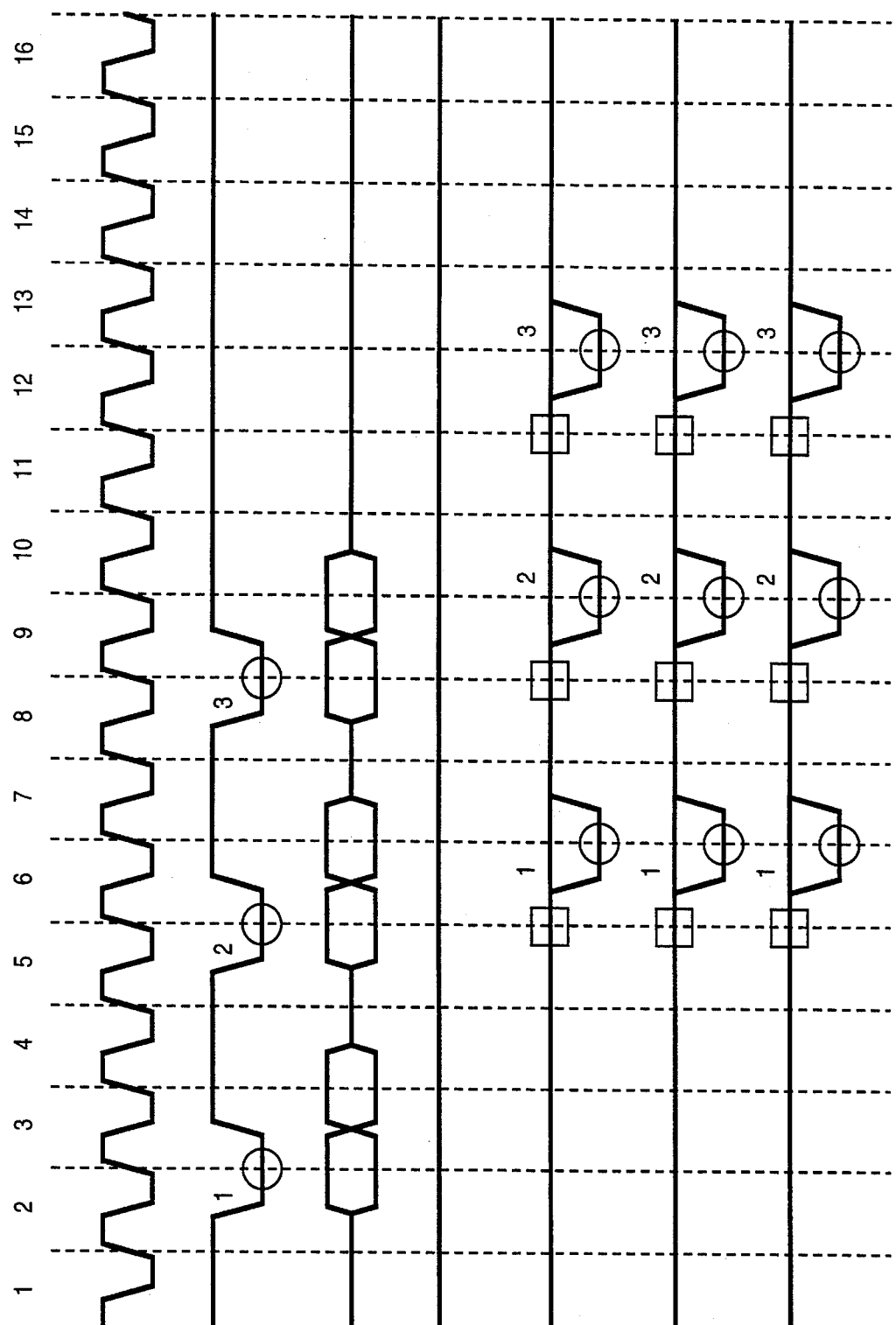
FIG__7

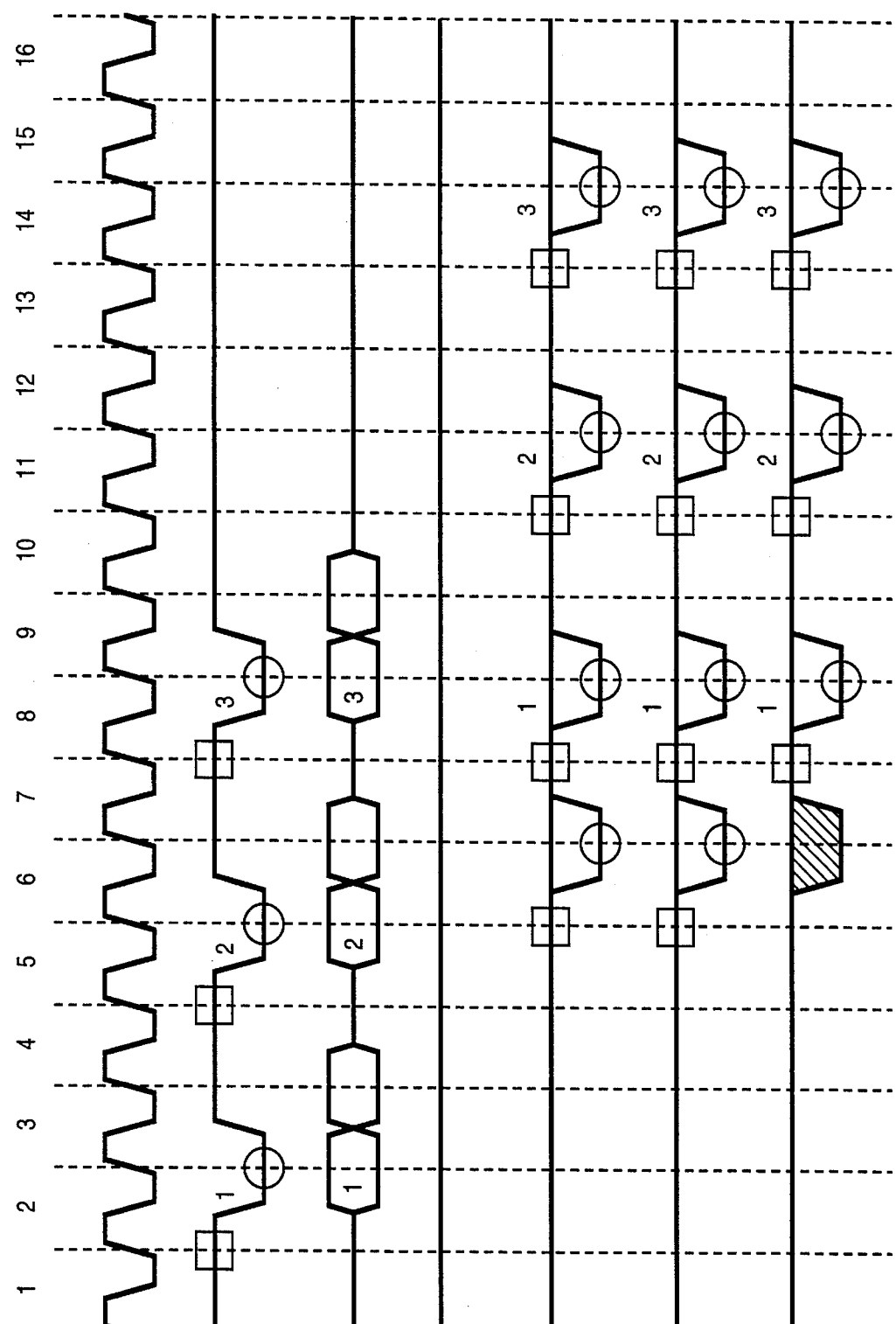

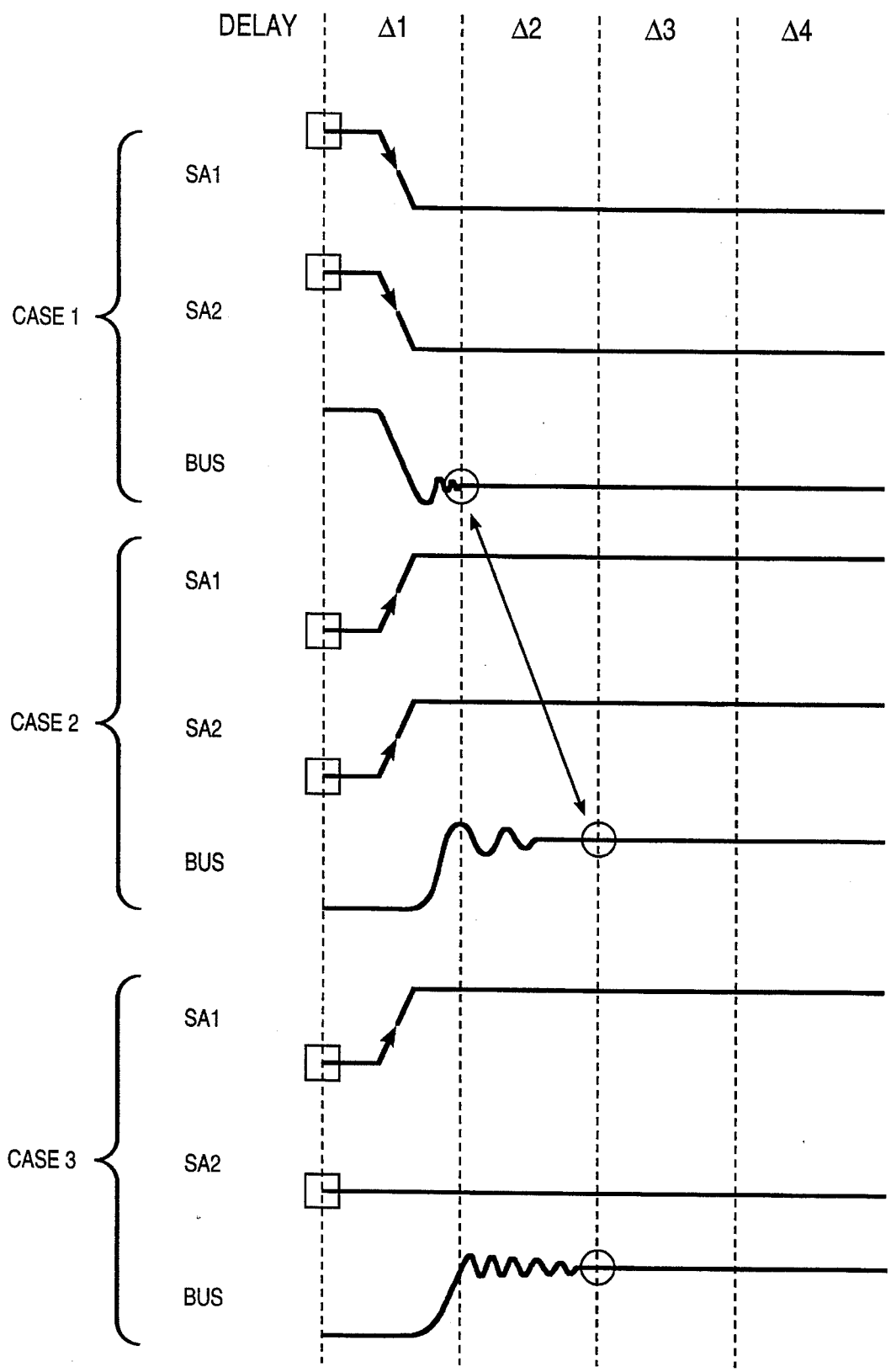
FIG_10

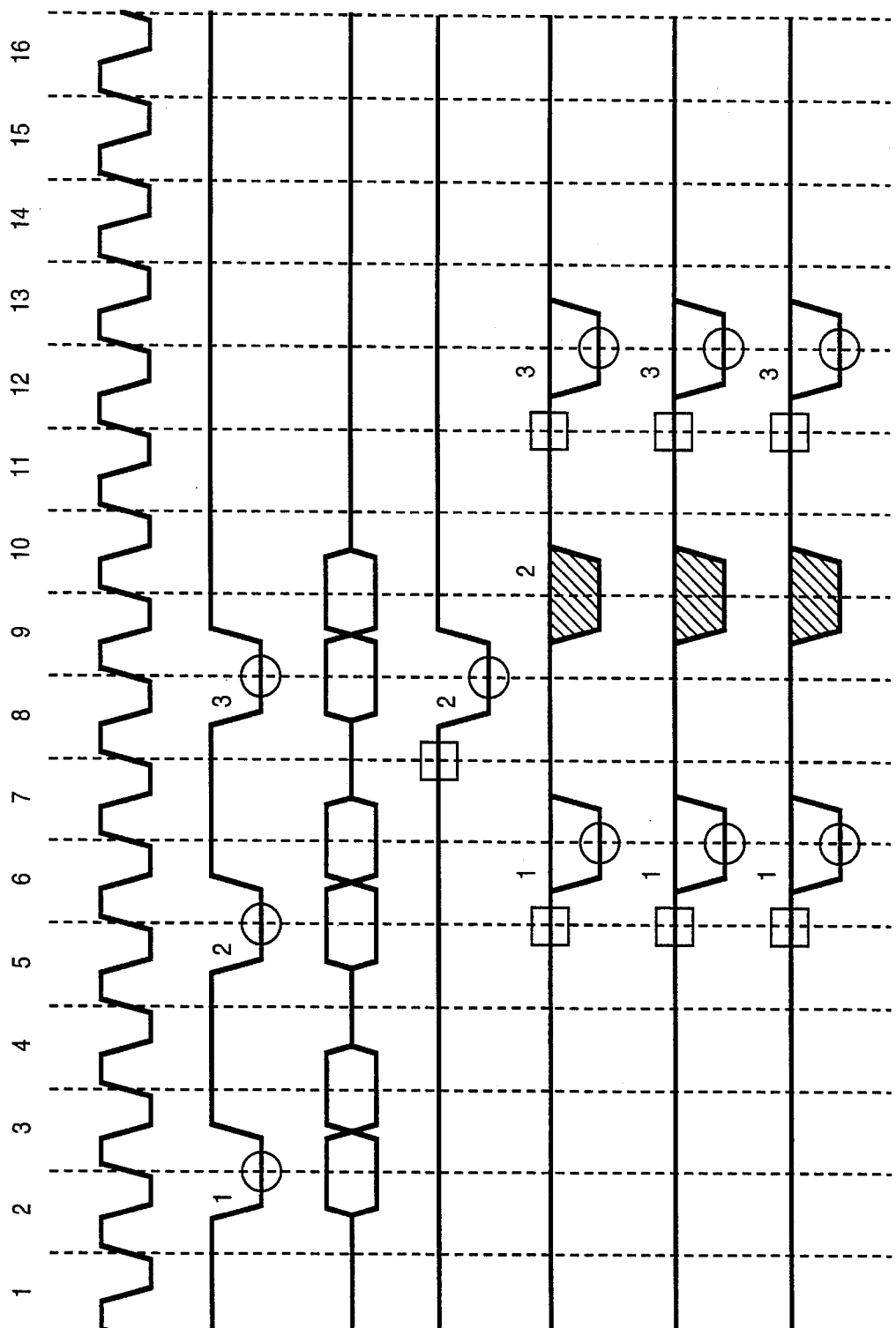
FIG_11

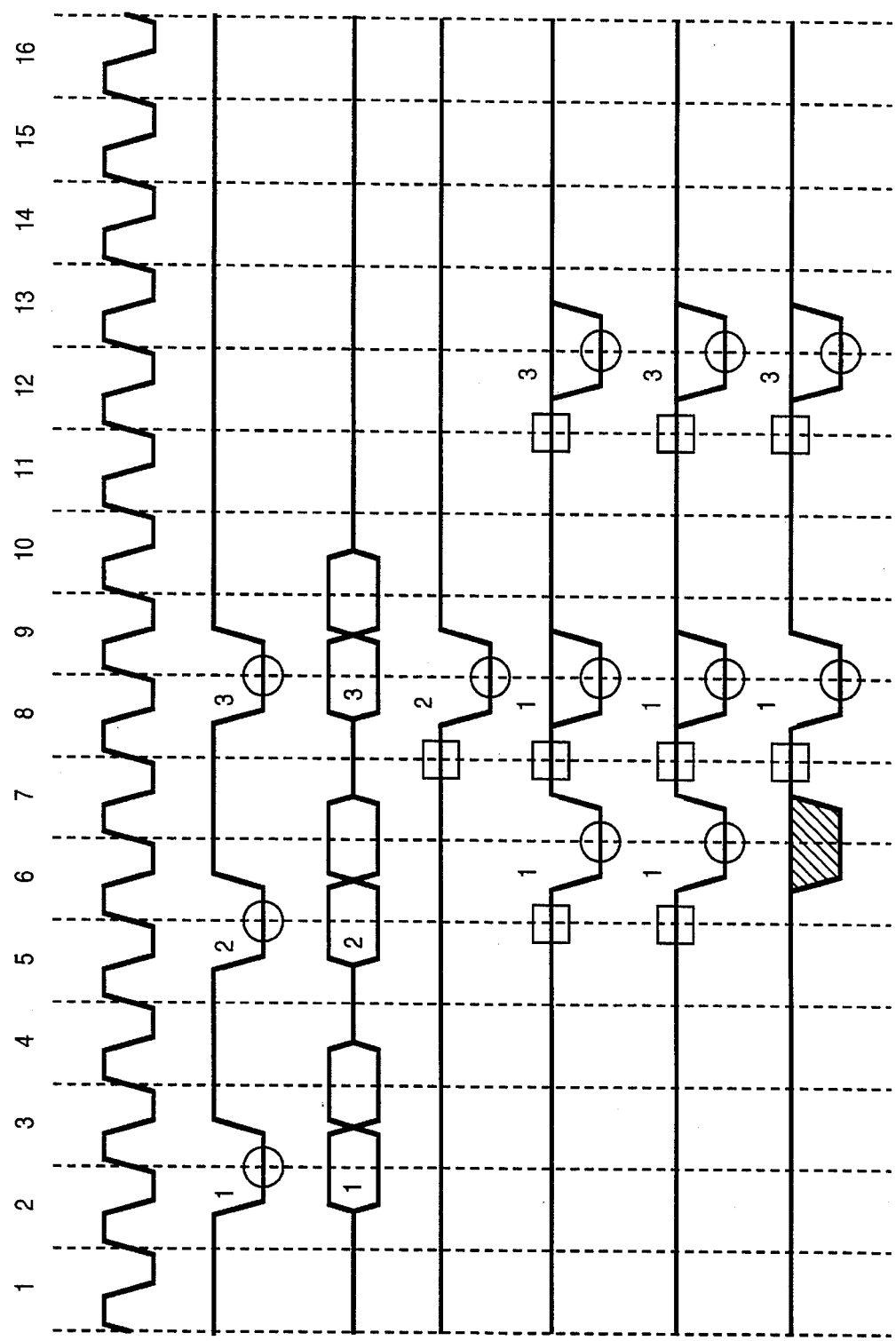
FIG_12

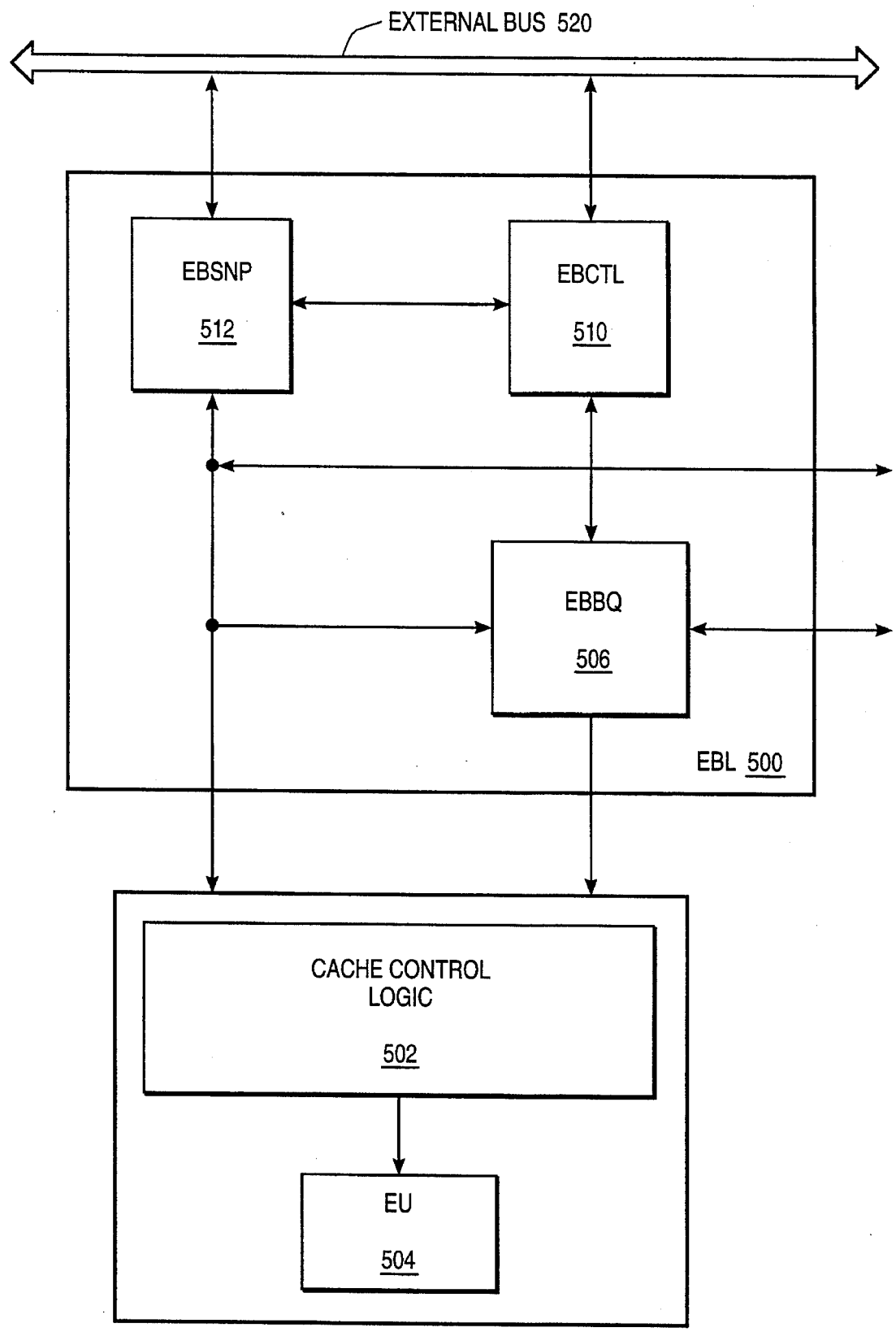
FIG_13

METHOD AND APPARATUS FOR SNOOP STRETCHING USING SIGNALS THAT CONVEY SNOOP RESULTS

BACKGROUND OF THE INVENTION

1. Field of the Invention

The present invention relates to the field of data processing, and more particularly to a protocol for snooping cache memory.

2. Description of the Related Art

Caches are used in various forms to reduce the effective time required by a processor to access instructions or data that are stored in main memory. The theory of a cache is that a system attains a higher speed by using a small portion of very fast memory as a cache along with a larger amount of slower main memory. The cache memory is usually placed operationally between the data processing unit or units and the main memory. When the processor needs to access main memory, it looks first to the cache memory to see if the information required is available in the cache. When data and/or instructions are first called from main memory, the information is stored in cache as part of a block of information (known as a cache line) that is taken from consecutive locations of main memory. During subsequent memory accesses to the same addresses, the processor interacts with the fast cache memory rather than main memory. Statistically, when information is accessed from a particular block in main memory, subsequent accesses most likely will call for information from within the same block. This locality of reference property results in a substantial decrease in average memory access time.

FIG. 1 is a simplified block diagram of the cache 100. The cache includes a set of cache lines 102. Each cache line 102 is capable of storing a block of data 104 from consecutive addresses in main memory. Each cache line 102 is associated with a tag 106, which represents a block address of the line. A set of MESI (Modified Exclusive Shared Invalid) bits 110 are used to maintain cache consistency. The reading and writing of data in the cache is controlled by a cache access logic circuit 112.

The use of cache memory in the context of various computer systems is illustrated in FIGS. 2, 3 and 4. FIG. 2 shows cache memory used in a uniprocessor system. A CPU 200 includes an internal L1 cache 202 and is coupled to a second level cache L2 204. The second level cache 204 may reside on its own chip or on the same chip as the CPU 200. The CPU 200 is coupled to a memory bus 206, which allows the CPU 200 to conduct transactions with main memory (DRAM) 208 through a memory controller 210, and with various input/output devices 212 over an I/O bus 214 through an I/O controller 216.

The processors and their corresponding caches (not shown) may be combined into a multiprocessor configuration such as that shown in FIG. 3. Processors CPU1 300, CPU2 302, CPU3 304 and CPU4 306 are each coupled to a multiprocessor bus 308. Through the multiprocessor bus 308, the individual processors may communicate with each other and with I/O (not shown) and memory (not shown). One skilled in the art would understand that any number of individual processors may be coupled to the multiprocessor bus.

FIG. 4 illustrates a more sophisticated system in which individual multiprocessor systems or "clusters" communicate with each other over a common bus. As shown in FIG. 4, a first cluster 400 includes a first multiprocessor MP1 402 coupled through a memory bus 404 to I/O 406, a third level cache L3 408, a memory unit 410 and a cluster controller 412.

A second cluster 414 includes a second multiprocessor MP2 416 coupled through a second cluster bus 418 to I/O 420, memory 422, a third level L3 cache 424 and a second cluster controller 426. The clusters 400 and 414 communicate with each other through their respective cluster controllers 412 and 426 over a cluster interconnect 428. One skilled in the art would understand that the multiprocessor clusters each include processors, an optional I/O controller and an optional memory controller. One skilled in the art would also understand that a large number of clusters may be connected in a multicluster system. Optionally, the cluster interconnect may include global memory controller 430 and global I/O controller 432.

In each of these systems, consistency must be maintained among the caches and memory distributed throughout the system. For example, a computer system may implement a write through policy to update main memory at the same time a write operation from a processor changes the contents of its cache. Alternatively, under a write back policy, the data in main memory is updated only when the cache line containing the data is forced out of the cache or when another agent in the system, such as another processor or another cluster, needs to access the data. A cache line may be forced out of the cache, for example, if it is the least recently used (LRU) cache line. By its very nature, the write back policy results in less traffic on the memory bus between cache and memory because it avoids the unnecessary writing of data to memory when the line may not be needed by another agent on the bus.

Table 1 illustrates some of the state transitions experienced by caches associated with a requesting agent and a snooping agent in response to a memory or I/O access request from the requesting agent. The term "requesting agent" is used to refer to a processor or other device, such as an I/O or cluster controller, initiating the access request. The term "snooping agent" refers to caches that snoop their buses for the access request to determine how to change the state of their associated cache lines to maintain cache consistency. For the sake of simplicity, the table only illustrates transitions from which the requesting agent cache line starts in the invalid state. One skilled in the art would understand how to extend the state transition table of Table 1 to describe state transitions beginning from the modified, exclusive and shared states.

TABLE 1

WRITE BACK

| | | Snoop Signal | | |
| --- | --- | --- | --- | --- |
| Request | Requesting Agent | HIT# | HITM# | Snooping Agent |
| Read | I → E | 0 | 0 | I → I |
| | I → S | 1 | 0 | S → S |
| | I → S | 1 | 0 | E → S |
| | I → S | 1 | 1 | M → S |
| | I → E | 0 | 1 | M → I |
| Write | I → M | 0 | 0 | I → I |
| | I → M | 1 | 0 | S → I |
| | I → M | 1 | 0 | E → I |
| | I → M | 1 | 1 | M → I |

Table 1 also includes the snoop results provided by a snooping agent in the form of active low HIT# and HITM# signals. Here, a 0 indicates that the signal is inactive, while a 1 represents that the signal is active.

Starting from the invalid state, in response to a memory access read request, if no snooping agent asserts the HIT# or HITM# signal, then the requesting agent cache line will go from the invalid to the exclusive state. The inactive snoop signals indicate that no other cache holds the cache line retrieved from memory in response to the memory access request, and that the line is thus exclusive to the requesting agent cache and not shared with any other caches.

If, however, in response to a read request, a snooping agent asserts the HIT# signal because it caches the requested line, then the requesting agent cache line will make a state transition from the invalid state to the shared state to indicate that the line is shared with another cache. If the line was previously in the exclusive state in the snooping agent cache, then it will also make a transition to the shared state to maintain consistency with the requesting agent cache, which now caches the same line.

If the line requested by the requesting agent is in modified state in a snooping agent, then the requesting agent cache line will make a transition from the invalid to the shared state or the exclusive state, depending on whether both the HIT# and HITM# signals are asserted together or just HITM# alone is asserted. Modified cache lines will be described immediately below.

When carrying out a write operation, write back caches typically assume a write allocate policy. Under this policy, to write the data into the cache, the requesting cache must first perform a "read for ownership" in which the cache first reads the line specified by the request address and then merges the write data into the request address location within the cache line. During the read for ownership phase, the requesting agent cache line makes a transition from the invalid state to the exclusive state. The snooping agents all make a transition to the invalid state to remain consistent with the requesting agent cache, which now "owns" the cache line. To complete the write operation, the requesting agent merges the write data into the cache line and sets its MESI state to modified (M) to indicate that the line is modified and thus inconsistent with main memory and all other caches.

Referring back to the read operation, if the snoop result indicates that the cache line requested by the requesting agent is in a modified (M) state in another snooping agent cache, then that snooping agent must intervene before memory can supply the data. The operation is a three step process. The requesting agent aborts the request. The snooping agent performs a write back operation to main memory. The requesting agent then retries the operation. Accordingly, the snooping agent will change the state of its transferred line from modified (M) to shared (S) for a read operation. However, if the read operation is a read for ownership, such as that performed as an interim step during a write operation, then the state of the line in the snooping agent is changed from modified (M) to invalid (I).

The MESI protocol exhibits a number of advantages. When a processor attempts to write a cache line and the line is in a modified or exclusive state in its cache, then it is known that the line is in an invalid state in all other caches. For that reason, the requesting agent need not perform operations on the memory bus to conduct the write operation, thus minimizing bus traffic. Moreover, conducting operations on the bus creates a bus access latency penalty, which the MESI state avoids.

From the above description, it is apparent that a requesting agent must monitor its bus for the snoop result to return from other snooping agents before it can complete the requested operation and correctly modify the state of the affected cache lines. However, under a number of circumstances, the transmission of the snoop results to the requesting agent may be delayed. First, the main cause of delay is that the snooping agent is a slow cache that takes a relatively long time to perform a tag match of the requested address with the tags in the cache. Second, the snooping agent may experience an internal block. This may occur when the local bus between the snooping agent's processor core and its local cache is occupied with a transaction between those two units. In that case, the local cache cannot be snooped to provide snoop results coming to an external bus. Third, a delay in receiving snoop results can occur due to an external deadlock in which the system is unable to determine whether a transaction is guaranteed to complete. This can happen when, for example, multiprocessor bus traffic or cluster interconnect traffic delays the placement of snoop results on to the respective multiprocessor bus or interconnect.

The delay in providing snoop results requires that all bus agents extend or "stretch" their snoop phases until the snoop results are available. Conventional systems support equivalent functions using multiple additional signals. In particular, a separate busy signal is used in such systems to indicate a snoop phase stretch. It is desirable to minimize the number of bus signals used to indicate cache state and the availability of cache results. In addition, it is desirable to use a minimal number of such bus signals to indicate the delay of signals other than those indicating cache state.

SUMMARY OF THE INVENTION

The present invention provides a protocol and related apparatus for snoop stretching in a computer system having at least one requesting agent for issuing bus transaction requests and at least one snooping agent for monitoring transaction requests and issuing bus signals onto an external bus. The bus transactions are timed by a bus clock signal having a plurality of cycles. To indicate snoop stretching, during a first cycle a first snooping agent asserts both a HIT# bus signal and a HITM# bus signal together to indicate that the first snooping agent must delay assertion of valid snoop results for a predetermined snoop period. During a later cycle, to indicate the end of the snoop stretch, the first snooping agent deasserts the assertion of both the HIT# and HITM# signals together and asserts its valid snoop results. The HIT# and HITM# signals alone each represent valid snoop results. If the first snooping agent must continue delaying assertion of valid snoop results, then it reasserts both the HIT# and HITM# bus signals together for the predetermined snoop period. If a second snooping agent is ready to assert its valid snoop results, it will do so while the first snooping agent causes a snoop stretch, and will reassert its valid snoop results up to and including the cycle that the first snooping agent deasserts it snoop stretch and asserts its own valid snoop results.

BRIEF DESCRIPTION OF THE DRAWINGS

FIG. 1 is a block diagram of a cache implementing the MESI protocol.

FIG. 2 illustrates the use of cache memory in a uniprocessor system.

FIG. 3 illustrates the use of cache memory in a multiprocessor system.

FIG. 4 illustrates the use of cache memory in a multicluster system.

FIG. 6 is a timing diagram illustrating the bus transaction phases used in the present invention.

FIG. 8 is a timing diagram illustrating a stalled snoop phase of the present invention.

FIG. 9 is a timing diagram illustrating the implementation of the protocol of the present invention by multiple snooping agents.

FIG. 10 illustrates the phenomenon of wired OR glitch.

FIG. 11 is a timing diagram illustrating snoop phase abortion according to the present invention.

FIG. 12 is a timing diagram illustrating snoop phase cancellation according to the present invention.

FIG. 13 is a block diagram illustrating the external bus logic of the present invention.

DETAILED DESCRIPTION OF THE INVENTION

The present invention provides a protocol and related apparatus for snoop stretching. For purposes of explanation, specific embodiments are set forth to provide a thorough understanding of the present invention. However, it will be apparent to one skilled in the art that the invention may be practiced without these details. In other instances, well-known elements, devices, process steps and the like are not set forth in detail in order to avoid obscuring the present invention.

The protocol of the present invention is implemented on an external bus over which requesting and snooping agents conduct memory access transactions. The external bus of the present invention uses a wired OR technology, which effectively treats the bus as the output of an OR gate having signals asserted by the bus agents as inputs. Wired OR technology allows signals to be driven and observed by each bus agent regardless of the signals asserted by the other agents. Wired OR bus technology is known in the art, although its use in the present invention is novel and unique.

BUS TRANSACTION PHASES

Figure 5:
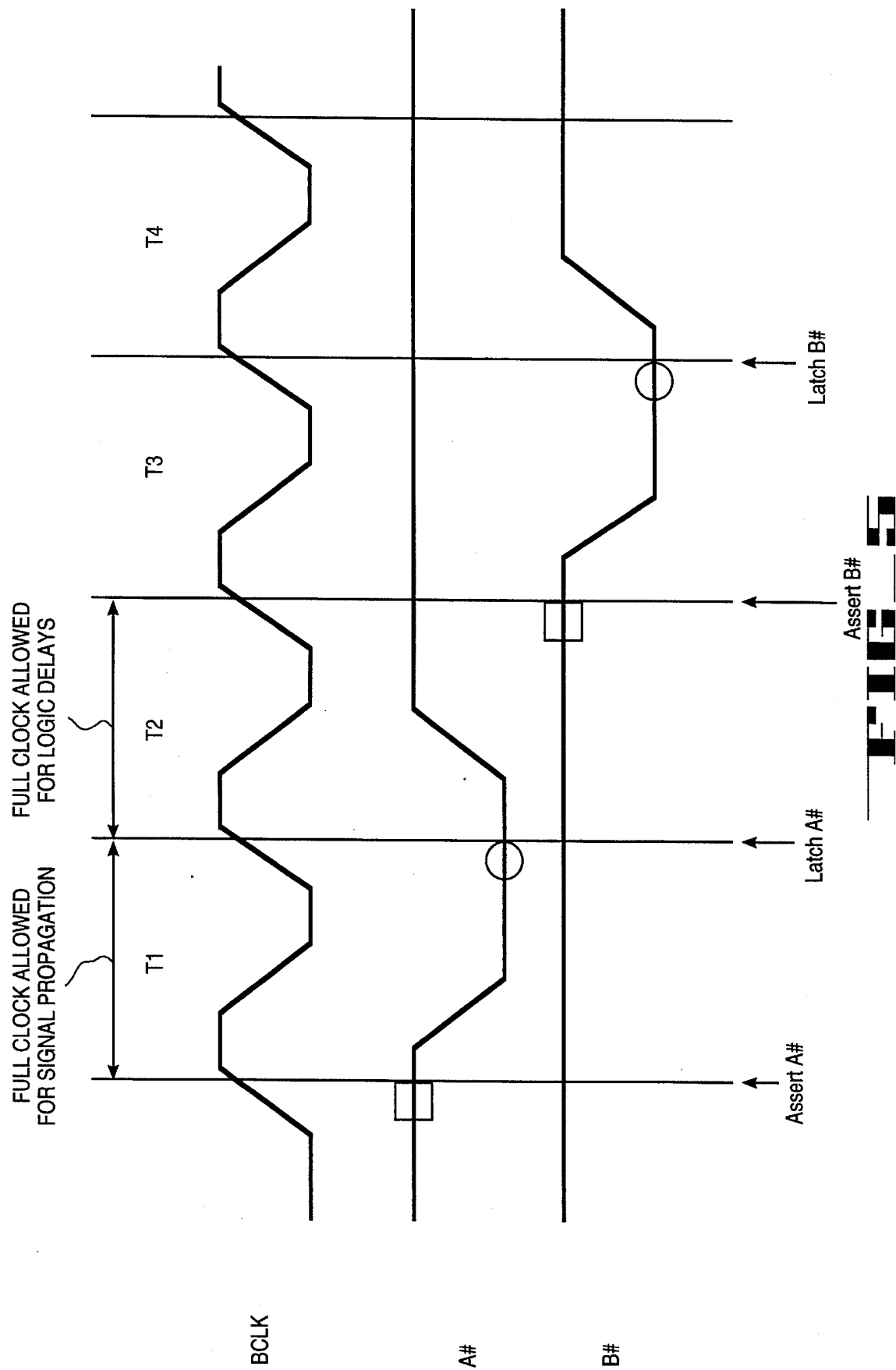
FIG. 5 is a timing diagram illustrating the synchronous latch bus protocol used in an embodiment of the present invention.

In one embodiment, the present invention supports a synchronous latched protocol, as illustrated in FIG. 5. On the rising edge of the bus clock (BCLK), all agents on the bus are required to drive their active outputs and sample their required inputs. In one embodiment, the present invention requires that every input be sampled during a valid sampling window on a rising clock edge and its effect be driven no sooner than the next rising clock edge. This approach allows one full clock for intercomponent communication and at least one full clock at the receiver to compute its response.

Referring to FIG. 5, the protocol is described as "B# is asserted one clock after A# is observed active," or "B# is asserted two clocks after A# is asserted." Note that A# is asserted in bus clock period T1, but not observed active until T2. The receiving agent uses T2 to determine its response and asserts B# in T3. Other agents observe B# active in T4. Note that the square and circle symbols are used in the timing diagrams to indicate the clock in which signals of interest are driven and sampled, respectively. The square indicates that a signal is driven (asserted, initiated) in that clock. The circle indicates that a signal is sampled (observed, latched) in that clock.

To clarify terminology, a "transaction" is the set of bus activity that is related to a single bus memory access request. A transaction begins with bus arbitration, and the assertion of a signal ADS# along with a transaction address. Transactions are driven to transfer data to inquire about or change cache states, or to provide the system with information. A transaction contains up to six phases. A phase uses a specific set of signals to communicate a particular type of information. The six phases of the bus protocol in an embodiment of the present invention are:

Arbitration

Request

Error

Snoop

Response

Data

Not all transactions contain all phases, and some phases can be overlapped.

FIG. 6 shows all the bus transaction phases for two transactions having data transfers. When a requesting agent does not own the bus, a transaction begins with an arbitration phase in which the requesting agent becomes the bus owner.

After the requesting agent becomes the bus owner, the transaction enters the request phase. In the request phase, the bus owner drives a request and address information on the bus. The request state is two clocks long. In the first clock, the signal ADS# is driven along with the transaction address with sufficient information to begin snooping a memory access. In the second clock, the byte enables, a transaction identifier, and the requested data transfer length are driven, along with other transaction information.

Every transaction's third phase is an error phase, three clocks after the request phase begins. The error phase indicates any parity errors triggered by the request.

Every transaction that is not canceled because an error was indicated in the error phase has a snoop phase, four or more clocks from the request phase. The snoop results indicate if the address driven for a transaction references a valid or modified (dirty) cache line in any bus agent's cache. Also, as described in U.S. patent application Ser. No. 08/205,023 entitled "Computer System That Maintains System Wide Cache Coherency During Deferred Communication Transactions, filed Mar. 1, 1994, the snoop results may also indicate whether a transaction will be completed in-order or may be deferred for possible out-of-order completion of bus transactions. In that case, a "snooping agent" may also be defined as a controller that determines those conditions.

Every transaction that is not canceled due to an error indicated in the error phase has a response phase. The response phase indicates whether the transaction has failed or succeeded, whether the transaction's completion is immediate or deferred, whether the transaction will be retried, and whether the transaction contains a data phase.

If the transaction does not have a data phase, that transaction is complete after the response phase. If the requesting agent has write data to transfer, or has requested read data, the transaction has a data phase which may extend beyond the response phase.

Not all transactions contain all phases, not all phases occur in order, and in some cases can be overlapped.

All transactions that are not canceled in the error phase have the request, error, snoop and response phases.

Arbitration can be explicit or implicit. The arbitration phase only needs to occur if the agent that is driving the next transaction does not already own the bus.

The data phase only occurs if a transaction requires a data transfer. The data phase can be response initiated, request initiated, snoop initiated, or request and snoop initiated.

The response phase overlaps at the beginning of the data phase for read transactions.

The response phase triggers the data phase for write transactions.

HIT#/HITM# SIGNALING

The present invention is primarily concerned with the snoop phase. On observing a new bus transaction request phase, the agents generate internal snoop requests (internal cache lookups) for all memory transactions. The snoop results are driven using the HIT# and HITM# signals in this phase. In the snoop phase, all snooping agents drive their snoop results and participate in coherency resolution. Referring to Table 2, according to the protocol of the present invention, a snooping agent indicates that it does not cache a requested cache line by not asserting either the HIT# or HITM# signal, i.e., the line is not allocated in its cache and thus invalid. If, however, a snooping agent is holding a requested cache line in a shared (S) or exclusive (E) state, then it indicates that it is holding a valid allocated line by asserting the HIT# signal and deasserting HITM#. If the snooping agent is caching a modified version of the requested cache line, then it asserts the HITM# signal and deasserts HIT#. Note that unlike conventional snooping protocols, the protocol of the present invention asserts only the HITM# signal and not both the HIT# and HITM# signals to indicate that the snooped line is in the modified state.

TABLE 2

| Snoop Signal | HIT# | HITM# |
| --- | --- | --- |
| Invalid | 0 | 0 |
| Valid (S or E) | 1 | 0 |
| Modified | 0 | 1 |
| Stretch | 1 | 1 |

As mentioned above, a number of conditions may cause a snooping agent to delay the transmission of its snoop results. In that case, the protocol of the present invention requires that a snooping agent assert both the HIT# and HITM# signals to indicate a "snoop stretch". The snoop stretch informs the requesting agent that it must wait for the snoop results on the bus before completing its memory access transaction.

The advantage of this protocol is that it avoids the need for an extra "snoop busy" signal to indicate a snoop stretch. However, as a tradeoff, an agent requesting a read transaction that hits a modified line in another cache must always cache the line in the shared state because the use of the HITM# signal alone to effect a transition from the invalid to the exclusive state (as shown in Table 1) is no longer available.

Figure 7:
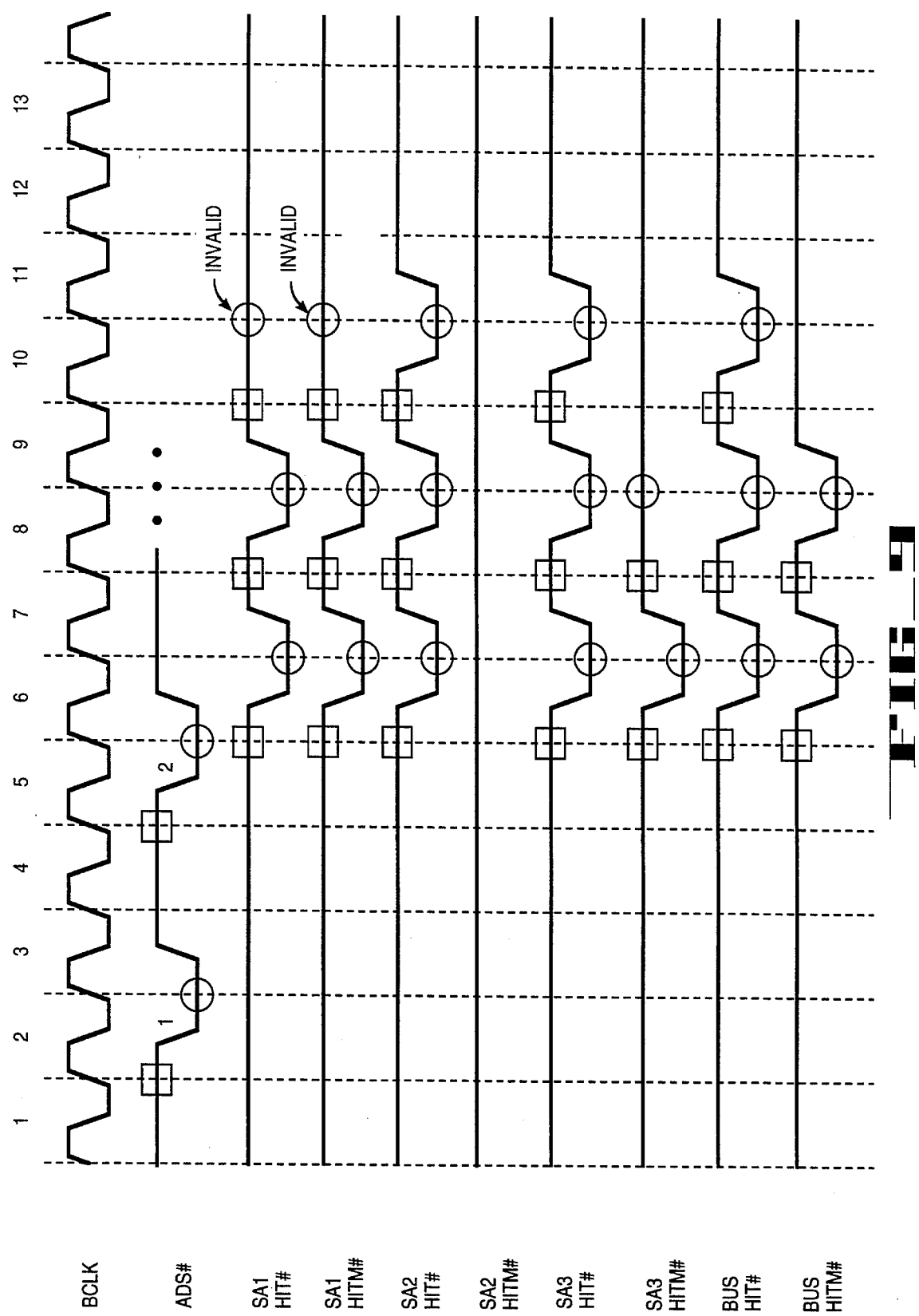
FIG. 7 is a timing diagram illustrating a normal snoop phase of the present invention.

The use of the HIT# and HITM# signals in the snooping protocol of the present invention will be described in further detail with reference to FIGS. 7 and 8.

NORMAL SNOOP PHASE

According to the protocol of the present invention, snoop results in the form of HIT# and HITM# signals are driven four clocks after assertion of ADS# or at least three clocks from the last valid snoop phase of the previous transaction, whichever is later. Note that in the timing diagram of FIG. 7, no snoop results are stalled and the maximum request generation rate is one request every three clocks.

In clock cycle 1, there are no transactions outstanding on the bus. In clock cycle 2, transaction 1 is issued, as indicated by the "1" in the ADS# line of the timing diagram. In clock cycle 5, transaction 2 is issued. In clock cycle 6, the snoop results for transaction 1 are driven by all snooping agents on the bus.

In this timing diagram, the HIT# and HITM# signals are drawn as being both high and low to indicate that the signals may respectively be inactive or active. Moreover, because the bus of the present invention uses wired OR technology, the HIT# and HITM# lines of the bus exhibit the cumulative effect of all snooping agents. Thus, if only one snooping agent asserts the HIT# and/or HITM# signals, those results will be observed by the all agents on the bus, regardless of the snoop results of the other snooping agents.

In clock cycle 7, the snoop results for transaction I are observed. In clock cycle 8, the third transaction is issued by a requesting agent. In clock cycle 10, four clock cycles after the assertion of transaction 2, the snoop results from transaction 2 are observed. In clock cycle 13, the snoop results for transaction 3 are observed.

Based upon the snoop results, the caches in the system perform the appropriate memory transactions and update their cache line states according to the protocol of the present invention.

STALLED SNOOP PHASE

FIG. 8 illustrates the case of a stalled snoop phase in which the snoop results are delayed on the bus due to a slow snooping agent. As shown in FIG. 8, transactions 1, 2 and 3 are initiated with ADS# activation in clock cycles 2, 5 and 8. The snoop phase for transaction 1 begins in clock cycle 6, four clocks from assertion of ADS#. All snooping agents capable of driving a valid snoop response within that four clock duration drive appropriate levels of the snoop signals HIT# or HITM#. A slower agent that is unable to generate a snoop response in four clocks asserts both HIT# and HITM# together in clock cycle 6 to extend the snoop phase. Because the bus uses wired OR technology, the active low HIT# and HITM# signals are those that are observed on the bus, regardless of the snoop results asserted by other snooping agents on the bus.

On observing active HIT# and HITM# in clock cycle 7, all agents on the bus determine that the transaction snoop phase is extended by two additional clocks through clock cycle 8. In the example shown in FIG. 8, in clock cycle 8 the slower snooping agent is ready with valid snoop results and needs no additional snoop phase extensions. Thus, in clock cycle 8 all agents drive valid snoop results using the snoop signals. In clock cycle 9 all agents observe that HIT# and HITM# are not asserted together in the same clock and determine that the valid snoop results for transaction 1 are available on the snoop signal lines of the bus.

According to the protocol of the present invention, for handling back-to-back transactions it is necessary to tie the snoop phase of the next transaction not only to ADS# plus 4 cycles after the start of the transaction, but to the end of the last valid snoop phase. As a result, the beginning of the next snoop phase is defined as the later of ADS# plus 4 clocks or snoop phase plus 3 clocks. Here, the snoop phase for transaction 2 begins in clock cycle 11, three clocks from the last valid snoop phase of transaction 1 (cycle 8 +3 clocks) or four clocks from the request phase of transaction 2 (cycle 5 +4 clocks), whichever is later. Since the snoop phase for transaction 2 is not extended (stretched), the snoop phase for transaction 2 completes in one clock.

The snoop phase for transaction 3 begins in clock cycle 14, the later of three clocks from the snoop phase of transaction 2 or four clocks from the request phase of transaction 3. Since the snoop phase for transaction 3 is not extended, the snoop phase for transaction 3 completes in one clock.

For the example shown above, the snoop phase always occurs six clocks from the request phase due to the initial snoop phase stall from transaction 1. However, the maximum request generation rate is still one request every three clocks.

FIG. 9 illustrates the protocol of the present invention in greater detail. Snooping agents SA1, SA2 and SA3 each place their respective HIT# and HITM# signals on to the external bus of the requesting agent in response to a memory access request by the requesting agent. The individual signals are described for clarification only. On a wired OR bus, only the resultant bus HIT# and bus HITM# signals are observed. The snoop results shown in the example of FIG. 9 are all assumed to be the response of the snooping agents to a transaction 1 asserted in the second BCLK cycle. The wired OR result of the assertion of the individual HIT# and HITM# signals on the bus is indicated in the figure by the lines BUS HIT# and BUS HITM#. In this example, snooping agent SA1 is a relatively slow responder to the memory access request. SA1 is not ready until clock 10 to indicate its snoop results, which are to be observed as invalid in clock cycle 11. SA1 indicates to the requesting agent that the requesting agent must wait for the snoop stall to be resolved by asserting both the HIT# and HITM# signals during clock cycles 6 and 8. During the intervening clock cycles 7 and 9, the requesting agent and the other snooping agents observe that SA1 is asserting a snoop stretch.

The assertion of a snoop stretch by one snooping agent has an effect not only on the requesting agent by causing it to wait for its snoop results, but also on the other snooping agents with respect to the manner in which they assert their snoop results on the bus. For example, referring to the actions of snooping agent SA2, SA2 is a fast responder that indicates that its requested cache line is valid (in the shared or exclusive state) by asserting the HIT# signal (and not HITM#) during clock cycle 6. However, because snooping agent SA1 indicated a snoop stall that is observed in clock cycle 7, snooping agent SA2 reasserts its snoop result at clock cycle 8. Subsequently, in response to the reassertion of the snoop stretch by snooping agent SA1 in clock cycle 8, upon observing the snoop stretch in clock cycle 9, snooping agent SA2 again reasserts its snoop result in clock cycle 10. Because no other agents on the bus indicate snoop stretching thereafter, the snoop results of SA2 (HIT#) can be observed in clock cycle 11 on the bus HIT# line.

In this example, snooping agent SA3 also needs to delay its snoop results, although not for as long as SA1. Accordingly, SA3 asserts both the HIT# and HITM# signals in clock cycle 6, but has its snoop result ready by clock cycle 8, in which it asserts the HIT# signal alone. Because of the snoop stretch indicated by SA1 in clock cycle 9, snooping agent SA3 reasserts its HIT# snoop result in clock cycle 10. Because the longest of the snoop stretches (that asserted by SA1) was deasserted in clock cycle 10, the snoop result from SA3 can be observed in clock cycle 11 along with the snoop results from all other snooping agents. The cumulative effect of the signals issued by the snooping agents is that the observation of valid snoop results is delayed from clock cycle 7 to clock cycle 11, for a total delay of four clock cycles because of the snoop stretching by SA1 and SA3. The cumulative effect is shown on the wired OR bus lines of FIG. 9.

After the snoop phase for the current transaction is over, all the bus agents make their cache state transitions as described in the previous table. The transaction is allowed to progress to its response phase in two clocks. The next transaction may begin its snoop phase a minimum of three clocks later.

EFFECT OF STALL ON SUBSEQUENT SNOOP PHASES

Referring back to FIG. 7, the diagram illustrates a number of fixed relationships between various signals. The request phases for each memory transaction are separated by three clock cycles. In an embodiment of this protocol, in the absence of any previous snoop phases, the snoop phase for a transaction occurs four clock cycles after assertion of the ADS# signal during the request phase. For example, in FIG. 7 the request is issued in clock cycle 2, the snoop results are driven four clocks later in clock 6 and the snoop results observed in clock 7. For the second transaction, the request phase commences in clock 5, the snoop results are driven four clocks later in clock 9 and observed in clock 10. Similarly, for the third transaction, the request phase begins in clock 8, the snoop results are asserted in clock 12 and observed in clock 13.

FIG. 8 illustrates the effect of a snoop phase stall on the snoop phases of subsequent transactions. In FIG. 8 both the HIT# and HITM# signals are asserted in clock cycle 6 to indicate a snoop stretch. This stretch lasts for two clock cycles from cycle 6 to cycle 8, in which cycle valid snoop results are asserted on the bus. Those snoop results are observed in clock cycle 9. Clearly, because of the snoop stretch the snoop results of subsequent transactions must also be stretched. Under an embodiment of the protocol of the present invention, the snoop phase of a transaction following a transaction causing a stretch snoop phase must begin three clocks from the beginning of the previous valid snoop phase or four clocks from the assertion of its own ADS# signal, whichever is later. Alternatively, the beginning of the next snoop phase can occur one clock cycle earlier, i.e., the later of two clocks from the beginning of the previous snoop phase or four clocks from the assertion of the ADS# signal.

STATE TRANSITION TABLES

The effect of the protocol of the present invention on cache state transitions is shown in Tables 3 and 4 below.

TABLE 3

MESI PROTOCOL

| Request | Requesting Agent | Snoop Signal | | Snooping Agent |
|---|---|---|---|---|
| | | HIT# | HITM# | |
| Read | I → E | 0 | 0 | I → I |
| | I → S | 1 | 0 | S → S |
| | I → S | 1 | 0 | E → S |
| | I → S | 0 | 1 | M → S |
| | Stretch | 1 | 1 | Stretch |
| Write | I → M | 0 | 0 | I → I |
| | I → M | 1 | 0 | E → I |
| | I → M | 1 | 0 | S → I |
| | I → M | 0 | 1 | M → I |
| | S → M | 0 | 0 | I → I |
| | S → M | 1 | 0 | E → I |
| | S → M | 1 | 0 | S → I |
| | S → M | 0 | 1 | M → I |
| | Stretch | 1 | 1 | Stretch |

Table 3 illustrates the MESI state transitions for a write back cache operating under the protocol of the present invention. The table shows that a snooping agent holding a line in a modified state asserts only the HITM# signal alone as its snoop response without simultaneously asserting the HIT# signal. The only time that both the HIT# and HITM# signals are asserted together is to indicate that a snooping agent must delay the transmission of its snoop results.

TABLE 4

MEI PROTOCOL

| Request | Requesting Agent | Snoop Signal | | Snooping Agent |
|---|---|---|---|---|
| | | HIT# | HITM# | |
| Read | I → E | 0 | 0 | I → I |
| | I → E | 0 | 0 | E → I |
| | I → E | 0 | 1 | M → I |
| | Stretch | 1 | 1 | Stretch |
| Write | I → M | 0 | 0 | I → I |
| | I → M | 0 | 0 | E → I |
| | I → M | 0 | 1 | M → I |
| | Stretch | 1 | 1 | Stretch |

The protocol of the present invention is of course not limited to cache memory holding its cache lines in the MESI state, but is applicable to any cache providing HIT# and HITM# signals. For example, Table 4 illustrates the use of the HIT#/HITM# signaling of the present invention under the MEI protocol. Again, the only time both the HIT# and HITM# signals are asserted together is to indicate snoop stretching. As an alternative embodiment, because the MEI protocol does not utilize the HIT# signal alone, snoop stretching could alternatively be indicated by asserting only the HIT# signal.

WIRED OR GLITCH SOLUTION

In addition to the use of a minimum number of snoop result signals, the present invention solves an inherent physical problem incurred by using a wired OR bus. Using wired OR technology, a number of individual agents contribute their signals to the bus. Unfortunately, the time it takes for the bus to settle on a wired OR result varies according to the different state transitions experienced by the signals input by the bus agents. Only after the bus has settled can the signals on the bus be safely observed.

FIG. 10 illustrates the "wired OR glitch" phenomenon. The bus settling time is measured with respect to propagation delay, which is the delay experienced by a signal traversing the physical length of the bus between any driver on the bus to any receiver on the bus. Propagation delay is a large component in the bus clock cycle and must be minimized and accounted for when designing the bus and the bus protocol.

Referring to FIG. 10, in Case 1, two snooping agents SA1 and SA2 experience high to low (inactive to active) transitions. FIG. 10 shows that the wired OR bus responds to these transitions and settles within one propagation delay. The ability of an observing agent to determine the valid state of a signal within one propagation delay from the time it was asserted is known as "incident wave switching."

However, referring to Case 2, when two snooping agents experience transitions from low to high (active to inactive), the bus takes more than one but less than two propagation delays to settle. Similarly, in Case 3, when one snooping agent experiences a transition from low to high, while the other is maintained in a low state, the bus again requires greater than one but less than two propagation delays to settle.

In summary, whenever at least one of the signals on the bus makes a transition from low to high, then regardless of the direction of the transition of the other signals on the bus, it may take greater than one propagation delay for the wired OR result to settle on the bus.

Referring to FIG. 9, the present invention overcomes the problem caused by the wired OR glitch and achieves incident wave switching by requiring an active signal asserted in one cycle to return to the high or inactive state in the next clock cycle. Moreover, to avoid wired OR glitch, all the signals on the bus are synchronized to assert their snoop signals synchronously on the rising edge of one clock cycle and to have their signals observed on the rising edge of the next clock cycle. Without insertion of the inactive high observation cycle, when an agent would stop stretching and go from low to high, other agents may continue to drive the bus to a low state, which would create an unsafe edge on which to observe. Moreover, the inserted cycle provides a synchronous marker informing the snooping agents when they can safely observe and assert their snoop signals. Thus, after assertion of a signal, the next clock cycle is reserved for safe observation of the bus result and determination of the response of the requesting agent to the snoop results on the bus.

ERROR HANDLING

Referring to FIGS. 11 and 12, the protocol of the present invention also allows the snoop phase to be aborted or canceled due to assertion of the error signal AERR# in the error phase. The AERR# signal represents an address parity error in the request. In one embodiment the error phase is one clock long and begins three clocks after the request phase begins (three clocks after ADS# is asserted). Cancellation occurs when there is time for all agents to cancel the snoop phase and not drive snoop results. Abortion occurs when some agents still drive snoop results, but the results are ignored.

FIG. 11 illustrates snoop phase abortion of a transaction due to activation of the AERR# signal in the error phase. Transactions 1, 2, and 3 are issued in clock cycles 2, 5 and 8, respectively, with assertion of ADS#. As discussed above, a snoop phase occurs during the later of three clocks from a previous valid unaborted snoop phase or four clocks from its own ADS# signal. Since AERR# is inactive in the error phase in clock cycle 5 and there is no history of a previous transaction snoop phase, the snoop phase for transaction 1 begins in clock cycle 6, four clocks from its request phase. Because no snooping agents extend the snoop phase for transaction 1, it completes in one clock.

Because AERR# is active in the error phase in clock cycle 8, all agents determine that transaction 2 is aborted, and thus all agents abort or ignore the snoop phase of transaction 2. All other agents may drive their valid snoop results in clock cycle 9 including an agent driving HIT# and HITM# together to indicate an extension of the snoop window. However, the assertion of AERR# overrides the stretch indication, if any.

However, because AERR# is inactive in the error phase in clock cycle 11, the snoop phase of transaction 3 begins at cycle 12, which is the later of four clocks from the request phase of transaction 3 and three clocks from the snoop phase of transaction 1. (Note that transaction 2 has been aborted and removed from the bus queue). Since no snooping agent extends the snoop phase for transaction three in this example, it completes in one clock.

FIG. 12 illustrates snoop phase cancellation of a transaction. Two events occur here—an extension of the snoop phase in a previous transaction combines with activation of AERR# in the error phase of the current transaction to cause the snoop phase for the current transaction to be canceled.

Transactions 1, 2 and 3 are initiated with ADS# activation in clock cycles 2, 5 and 8. The snoop phase for transaction 1 begins in clock cycle 6, four clocks from ADS#. A slow snooping agent drives both HIT# and HITM# active during clock cycle 6 to extend the snoop phase for transaction 1 until clock cycle 8. This guarantees that the snoop phase of transaction 2 cannot occur at least for three additional clocks, until clock cycle 11.

Because AERR# is active in clock cycle 8 during the error phase of transaction 2, transaction 2 is removed from the bus queue in clock cycle 9 during observation of AERR#. This removal provides sufficient time for all agents to cancel the snoop phase of transaction 2.

The snoop phase for transaction 3 begins in clock cycle 12, the later of four clocks from the transaction 3 request phase and three clocks from the transaction 1 snoop phase.

Along with parity errors, another type of error affects the snoop phase. Under the MESI protocol as implemented by the present invention, if a snooping agent holds a particular cache line in a modified state, that same cache line must be held in an invalid state in all other snooping agents. Thus, during the snoop phase, one cache will assert a HITM# snoop result and all other caches should not assert either the HIT# or HITM# signals. However, an error may occur in which another cache mistakenly asserts the HIT# signal during the snoop phase, thus resulting in both the HIT# and HITM# signals being asserted on the wired OR bus. This condition would be erroneously detected as a snoop stretch. The assertion of these two signals together is likely to continue for an indefinite period of time. To account for this error condition, the bus includes a time-out mechanism that asserts an initiation signal BINIT# informing all bus agents to clear out their bus queues. The time-out mechanism may reside in an I/O controller that monitors the external bus over which the snoop signals are communicated. Alternatively, the time-out mechanism may also be implemented in the cluster controller, among other units. Upon detection, the time-out mechanism also initiates an error recovery program that can be resident in memory or disk, for example. The error recovery program may cancel the running application program, or deliver an error message to the user. The time-out mechanism can also be used in a more general sense to handle overly long indefinite snoop stretches caused by natural reasons, such as an extremely long deadlock in a remote processor cluster.

EXTERNAL BUS LOGIC

FIG. 13 illustrates an external bus logic circuit (EBL) that implements the protocol of the present invention. Every bus agent coupled to an external bus, including processors, I/O controllers, memory interfaces and cluster controllers, incorporates an EBL circuit to maintain memory consistency throughout the system and enforce the bus protocol. In the context of a processor, the EBL 500 is the unit closest to the bus interface, the cache control logic (CCL) 502 and the execution unit 504. The processor execution unit 504 can be found in a standard in-order microprocessor or one that supports the speculative out-of-order execution of instructions. The EBL 500 includes a bus request queue circuit (EBBQ) 506, an external control logic circuit (EBCTL) 510, and an external snoop logic circuit (EBSNP) 512.

External bus 520 is essentially a processor memory bus. The EBL 500 acts as an interface between a processor, such as one including cache control logic 502, and the external bus 520, both of which may run at different clock speeds.

The bus request queue circuit 506 receives transaction requests from the CCL 502. It delivers those requests to the external bus 520 in order to obtain the requested information from another bus agent. The EBBQ 506 can be viewed as the transaction "scheduler" for the EBL 500.

The external snoop logic (EBSNP) 512 is responsible for processing external snoop requests. It issues snoop inquiries to the CCL 502 and EBBQ 506 based on snoop requests from the external bus. It is also responsible for issuing memory state change directives to the CCL 502 and the EBBQ 506 based on external request type and internal snoop results.

The external control logic (EBCTL) 510 implements the bus protocol defined herein, and is responsible for forwarding requests from the EBBQ 506 to the external bus, informing the EBSNP 512 and EBBQ 506 of external request activity, transferring requested data between the CCL 502 and the external bus, and tracking the status of all outstanding requests on the bus.

When snooping the external bus 520, the EBCTL 510 and EBSNP 512 capture the external bus signals. The EBSNP 512 forwards the snoop inquiry to the CCL 502 and EBBQ 506, which return a snoop response (not in HIT#/HITM# form at this point). The snoop inquiry includes the snoop address and an indication of the type of snoop that is being performed.

If the CCL 502 is busy due to ongoing activity with the execution unit 504 or if EBSNP 512 detects an address match with respect to an outstanding transaction, either one of these conditions may delay transmission of the snoop results to the EBCTL 510. In response to the actual result or an indication of delay, the external control logic 510 drives the appropriate HIT# and/or HITM# signals to the external bus 520.

The external control logic (EBCTL) 510 also performs error checks on incoming and outgoing requests. Specifically, when, in acting as part of a snooping agent, EBCTL 510 detects a parity error in an incoming address, it asserts AERR# to indicate the address (parity) error and forwards the signal to the external bus. Conversely, when, in acting as part of a requesting agent, EBCTL 510 detects an AERR# signal on an outgoing address, it forwards the signal to the EBBQ logic. The EBBQ logic performs a retry or invokes an error handling routine.

It will be appreciated that various modifications and alterations might be made by those skilled in the art without departing from the spirit and scope of the present invention. For example, the present invention may be physically embodied in a variety of packages. The present invention may be built into one integrated circuit package or have its functionality spread over a number of chips, or be implemented by an emulator. Moreover, the invention may be constructed on chips of different materials, such as silicon or gallium arsenide. Finally, the present invention may operate in a processor environment that allows speculative superscalar, out-of-order execution or within a pipelined processor environment that performs neither speculative execution, out-of-order execution, nor superscalar operation. The invention should, therefore, be measured in terms of the claims which follow.

What is claimed is:

1. In a computer system having at least one requesting agent for issuing bus transaction requests and at least one snooping agent for monitoring transaction requests and issuing bus signals on an external bus, wherein the bus transactions are timed by a bus clock signal having a plurality of cycles, a method for stretching the snoop phase of a bus transaction comprising the steps of:

during a first cycle, a first snooping agent asserting both a HIT# bus signal and HITM# bus signal together to indicate that the first snooping agent must delay assertion of valid snoop results for a predetermined snoop period;

during a later cycle, the first snooping agent deasserting the assertion of both the HIT# and HITM# bus signals together and asserting its valid snoop results.

2. The method of claim 1, wherein when the HIT# and HITM# bus signals are not asserted together by the same snooping agent, they each represent valid snoop results, the HIT# bus signal alone indicating that a cache line associated with the transaction request is stored in a shared or exclusive state in a cache associated with a snooping agent, and the HITM# bus signal alone indicating that a cache line associated with the transaction request is stored in a modified state in a cache associated with a snooping agent.

3. The method of claim 1, further comprising the step of:
before the later cycle, the first snooping agent reasserting both the HIT# and HITM# bus signals together if the first snooping agent must again delay assertion of the snoop results for the predetermined snoop period.

4. The method of claim 1, wherein the external bus is a wired OR bus and the computer system includes a second snooping agent, the method further comprising the steps of:
during the first cycle, the second snooping agent asserting its valid snoop results; and
during the later cycle, the second snooping agent reasserting its valid snoop results.

5. The method of claim 1, wherein the external bus is a wired OR bus and the computer system includes a second agent, the method further comprising the steps of:
during the first cycle, the second snooping agent asserting both a HIT# bus signal and a HITM# bus signal together to indicate that the second snooping agent must delay assertion of valid snoop results for the predetermined snoop period; and
during the later cycle, the second snooping agent reasserting both the HIT# and HITM# bus signals together; and
during a second later cycle after the later cycle, the second snooping agent deasserting the assertion of both the HIT# and HITM# bus signals together and asserting its valid snoop results, and the first snooping agent reasserting its valid snoop results.

6. The method of claim 1, wherein the external bus is a wired OR bus the bus signals being logically inactive when in a high voltage state and logically active when in a low voltage state.

7. The method of claim 6, wherein the period of the bus clock cycle is small enough to accomplish incident wave switching of the bus signals on the wired OR bus.

8. The method of claim 1, wherein each bus transaction has a request phase during which a transaction request is issued,
each request phase is separated by a predetermined request generation period,
in the absence of a previous stretched snoop phase, the beginning of the snoop phase for a transaction is separated from the beginning of the request phase of the transaction by a predetermined request-snoop lag time,
if a previous snoop phase was stretched, the beginning of the snoop phase for a transaction is separated from the time valid snoop results are asserted for a previous transaction by a predetermined snoop-snoop lag time, and the snoop-snoop lag time is shorter in duration than the request-snoop lag time.

9. The method of claim 8, wherein the predetermined request generation period comprises three bus clock cycles and the predetermined request-snoop lag time comprises four bus clock cycles.

10. The method of claim 9, wherein the predetermined snoop-snoop lag time comprises three bus clock cycles.

11. The method of claim 9, wherein the predetermined snoop-snoop lag time comprises two bus clock cycles.

12. The method of claim 8, wherein
the external bus is a wired OR bus,
each bus transaction has an error phase during which an error signal may be asserted and if an error signal is asserted during the error phase of a transaction,
in the absence of a previous stretched snoop phase, any snoop results asserted during the snoop phase for the transaction are ignored,
if a previous snoop phase was stretched, the snoop phase for the transaction is canceled by all snooping agents.

13. In a computer system having at least one requesting agent for issuing bus transaction requests and at least one snooping agent for monitoring transaction requests and issuing bus signals on an external bus, wherein the bus transactions are timed by a bus clock signal having a plurality of cycles, a method for stretching the snoop phase of a bus transaction comprising the steps of:
a first snooping agent asserting both a HIT# bus signal and a HITM# bus signal together when the first snooping agent must delay assertion of valid snoop results for a predetermined snoop period, the cycle in which the first snooping agent asserts both signals together being denoted a first cycle, and
when the first snooping agent is ready to assert its valid snoop results, the first snooping agent deasserting the assertion of both the HIT# and HITM# bus signals together and asserting its valid snoop results, the cycle in which the first snooping agent asserts its valid snoop results being denoted at a later cycle.

14. The method of claim 13, wherein
the external bus is a wired OR bus,
each bus transaction has an error phase during which an error signal may be asserted and if an error signal is asserted during the error phase of a transaction,
in the absence of a previous stretched snoop phase, any snoop results asserted during the snoop phase for the transaction are ignored,
if a previous snoop phase was stretched, the snoop phase for the transaction is canceled by all snooping agents.

15. A computer system for implementing a snoop stretching protocol, the system having a bus clock for generating a bus clock signal having a plurality of cycles for timing bus transactions, the system comprising:
at least one external bus for communicating bus signals and bus transaction requests;
at least one requesting agent, coupled to a corresponding external bus, for issuing bus transaction requests; and
at least one snooping agent, coupled to a corresponding external bus, for monitoring transaction requests and issuing bus signals on its corresponding external bus, wherein
a first snooping agent asserts both a HIT# bus signal and a HITM# bus signal together when the first snooping agent must delay assertion of valid snoop results for a predetermined snoop period, the cycle in which the first snooping agent asserts both signals together being denoted a first cycle, and
when the first snooping agent is ready to assert its valid snoop results, the first snooping agent deasserts the assertion of both the HIT# and HITM# bus signals together and asserts its valid snoop results, the cycle in which the first snooping agent asserts its valid snoop results being denoted a later cycle.

16. The system of claim 15, wherein, when the HIT# and HITM# bus signals are not asserted together by the same snooping agent, they each represent valid snoop results, the HIT# bus signal alone indicating that a cache line associated with the transaction request is stored in a shared or exclusive state in a cache associated with a snooping agent, and the HITM# bus signal alone indicating that a cache line associated with the transaction request is stored in a modified state in a cache associated with a snooping agent.

17. The system of claim 15, wherein the first snooping agent reasserts both the HIT# and HITM# bus signals together before the later cycle if the first snooping agent must again delay assertion of the snoop results for the predetermined snoop period.

18. The system of claim 15, wherein the external bus is a wired OR bus, during the first cycle, if a second snooping agent is ready to assert its valid snoop results, the second snooping agent asserts its valid snoop results; and during the later cycle, if the first snooping agent is asserting both the HIT# bus signal and the HITM# bus signal together, the second snooping agent reasserts its valid snoop results.

19. The system of claim 15, wherein the external bus is a wired OR bus, during the first cycle, if the second snooping agent must delay assertion of its valid snoop results for the predetermined snoop period, the second snooping agent asserts both a HIT# bus signal and a HITM# bus signal together, and during the later cycle, if the second snooping agent must again delay assertion of its valid snoop results for the predetermined snoop period, the second snooping agent reasserts both the HIT# and HITM# bus signals together; and during a second later cycle after the later cycle, if the second snooping agent is ready to assert its valid snoop results, the second snooping agent deasserts the assertion of both the HIT# and HITM# bus signals together and asserts its valid snoop results, and the first snooping agent reasserts its valid snoop results.

20. The system of claim 15, wherein the external bus is a wired OR bus, the bus signals being logically inactive when in a high voltage state and logically active when in a low voltage state.

21. The system of claim 20, wherein the period of the bus clock cycle is small enough to accomplish incident wave switching of the bus signals on the wired OR bus.

22. The system of claim 15, wherein each bus transaction has a request phase during which a transaction request is issued, each request phase is separated by a predetermined request generation period, in the absence of a previous stretched snoop phase, the beginning of the snoop phase for a transaction is separated from the beginning of the request phase of the transaction by a predetermined request-snoop lag time, if a previous snoop phase was stretched, the beginning of the snoop phase for a transaction is separated from the time valid snoop results are asserted for a previous transaction by a predetermined snoop-snoop lag time, and the snoop-snoop lag time is shorter in duration than the request-snoop lag time.

23. The system of claim 22, wherein the predetermined request generation period comprises three bus clock cycles and the predetermined request-snoop lag time comprises four bus clock cycles.

24. The system of claim 23, wherein the predetermined snoop-snoop lag time comprises three bus clock cycles.

25. The system of claim 23, wherein the predetermined snoop-snoop lag time comprises two bus clock cycles.

26. The system of claim 15, wherein the external bus is a wired OR bus, each bus transaction has an error phase during which an error signal may be asserted, if a snooping agent or a requesting agent asserts an error signal during the error phase of a transaction:

in the absence of a previous stretched snoop phase, all snooping agents and requesting agents ignore the snoop results asserted during the snoop phase of the transaction, if a previous snoop phase was stretched, the snoop phase for the transaction is canceled by all snooping agents.

27. The method of claim 1, further comprising the step of:

if the HIT# and HITM# bus signals are asserted simultaneously for greater than a predetermined period of time, thereby producing a cache protocol violation, detecting and handling the protocol violation.

28. The method of claim 13, further comprising the step of:

if the HIT# and HITM# bus signals are asserted simultaneously for greater than a predetermined period of time, thereby producing a cache protocol violation, detecting and handling the protocol violation.

29. The computer system of claim 15, further comprising a time-out mechanism for detecting and handling a protocol violation, wherein the protocol violation occurs if the HIT# and HITM# bus signals are asserted simultaneously for greater than a predetermined period of time.

30. The method of claim 6, wherein each bus clock cycle has a first edge and a second edge, the bus signals being driven on the first edge of a bus clock cycle and observed on the first edge of a next bus clock cycle.

31. The method of claim 30, wherein the first edge is a rising edge and the second edge is a falling edge.

32. The system of claim 20, wherein each bus clock cycle has a first edge and a second edge, the bus signals being driven on the first edge of a bus clock cycle and observed on the first edge of a next bus clock cycle.

33. The system of claim 32, wherein the first edge is a rising edge of a bus clock cycle and the second edge is a falling edge of a bus clock cycle.

34. In a computer system having at least one requesting agent for issuing bus transaction requests and at least one snooping agent for monitoring transaction requests and issuing bus signals on an external bus, a method for stretching the snoop phase of a bus transaction comprising the steps of:

during a first cycle, a first snooping agent asserting both a first bus signal and a second bus signal together to indicate that the first snooping agent must delay assertion of valid snoop results for a predetermined snoop period;

during a later cycle, the first snooping agent deasserting the assertion of both the first and second bus signals together and providing its valid snoop results using said first and second bus signals individually.

35. The method of claim 34, wherein when the first and second bus signals are not asserted together by the same snooping agent, they each represent valid snoop results, the first bus signal alone indicating that a cache line associated with the transaction request is stored in a shared or exclusive state in a cache associated with a snooping agent, and the second bus signal alone indicating that a cache line associated with the transaction request is stored in a modified state in a cache associated with a snooping agent.

36. The method of claim 34, further comprising the step of:

before the later cycle, the first snooping agent reasserting both the first and second bus signals together if the first snooping agent must again delay assertion of the snoop results for the predetermined snoop period.

37. The method of claim 34, wherein the external bus is a wired OR bus and the computer system includes a second snooping agent, the method further comprising the steps of:

during the first cycle, the second snooping agent asserting its valid snoop results; and during the later cycle, the second snooping agent reasserting its valid snoop results.

38. The method of claim 34, wherein the external bus is a wired OR bus and the computer system includes a second snooping agent, the method further comprising the steps of:

during the first cycle, the second snooping agent asserting both a first bus signal and a second bus signal together to indicate that the second snooping agent must delay assertion of valid snoop results for the predetermined snoop period; and during the later cycle, the second snooping agent reasserting the both the first and second bus signals together; and during a second later cycle after the later cycle, the second snooping agent deasserting the assertion of both the first and second bus signals together and asserting its valid snoop results, and the first snooping agent reasserting its valid snoop results.

39. The method of claim 34, wherein the external bus is a wired OR bus and each bus clock cycle has a first edge and a second edge, the bus signals being deasserted inactive high and latched on the first edge of a bus cycle after being asserted active low or inactive high on the first edge of a previous bus cycle.

40. The method of claim 34, wherein each bus transaction has a request phase during which a transaction request is issued, each request phase is separated by a predetermined request generation period, in the absence of a previous stretched snoop phase, the beginning of the snoop phase for a transaction is separated from the beginning of the request phase of the transaction by a predetermined request-snoop lag time, if a previous snoop phase was stretched, the beginning of the snoop phase for a transaction is separated from the time valid snoop results are asserted for a previous transaction by a predetermined snoop-snoop lag time, and the snoop-snoop lag time is shorter in duration than the request-snoop lag time.

\* \* \* \* \*